UNITED STATES PATENT OFFICE.

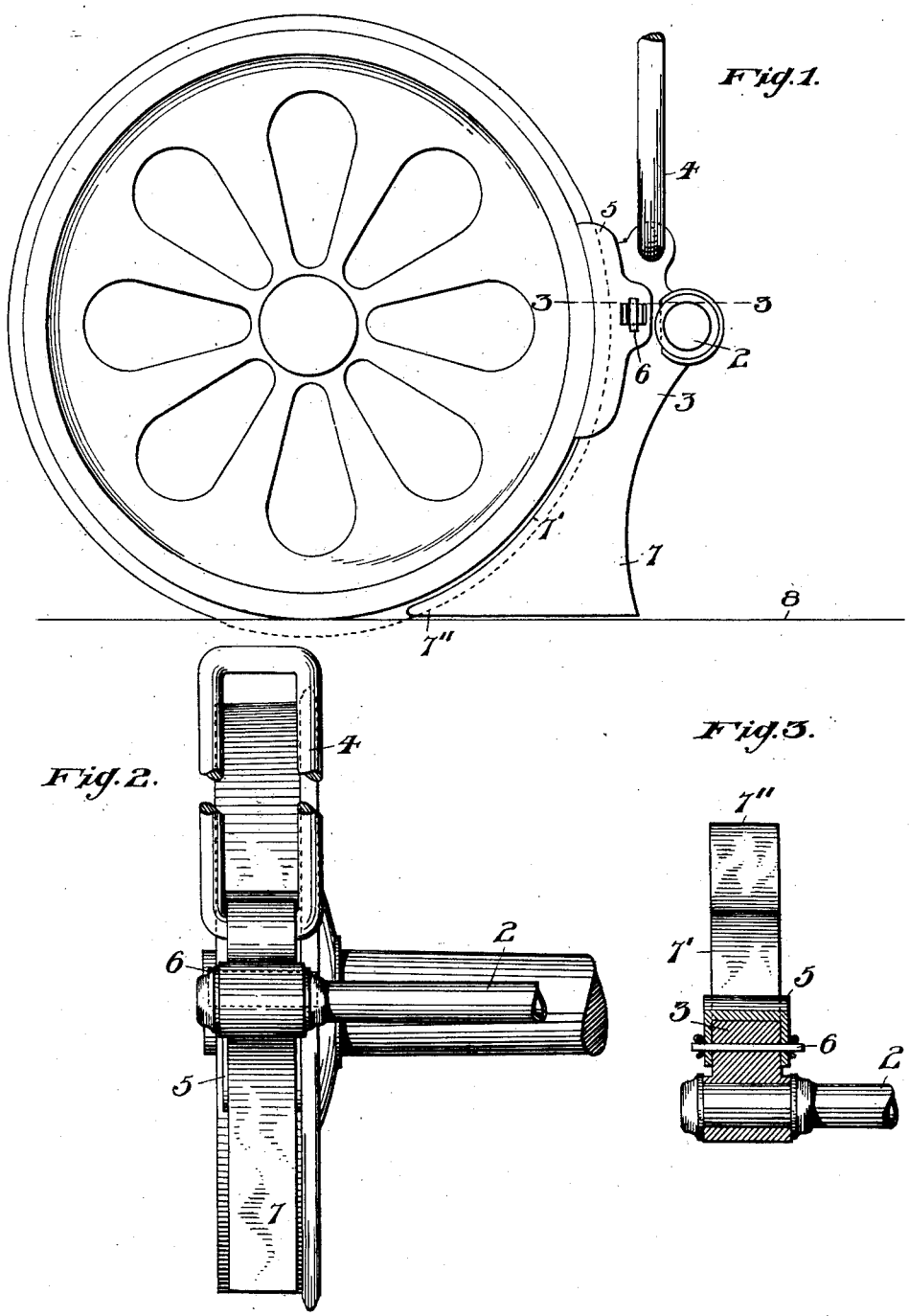

EDMUND P. CRALEY, OF McKEESPORT, PENNSYLVANIA.

WHEEL-GUARD.

No. 826,768.     Specification of Letters Patent.     Patented July 24, 1906.

Application filed April 30, 1906. Serial No. 314,345.

*To all whom it may concern:*

Be it known that I, EDMUND P. CRALEY, a citizen of the United States, residing at McKeesport, in the county of Allegheny and State of Pennsylvania, have invented certain new and useful Improvements in WheelGuards, of which the following is a specification, reference being had therein to the accompanying drawings.

The object of this invention is to provide a wheel-guard of improved construction which extends from the brake-beam nearly to the track and is curved backwardly beneath the wheel as far as practicable without interfering with the tread of the wheel on the rail. When thus constructed, the guard operates to push forward any object that may be on the track, and the backwardly-curved lower portion of the guard renders it quite impossible for any portion of the body of a person struck by the guard to get between the wheel and track.

The invention is embodied in a guard which is combined and preferably formed integral with the brake-shoe holder, and hence is always in place and in close proximity to the wheel and track without interfering therewith.

In the accompanying drawings, Figure 1 is a side elevation of a wheel and a portion of the brake mechanism equipped with my improvement. Fig. 2 is a front view. Fig. 3 is a sectional view taken on line 3 3 of Fig. 1.

Referring to the drawings, 2 designates the brake-beam; 3, the brake-shoe holder carried by the end of the beam; 4, the hanger, and 5 the brake-shoe, here shown detachably secured to holder 3 by key 6. The brake-beam, the hanger, the brake-shoe and the means for connecting it with the shoe-holder, and the upper portion of said holder may be of the usual or any preferred form, as my invention does not pertain to the construction of said parts.

Depending from shoe-holder 3 and here shown formed integral therewith is guard 7, which extends into close proximity to rail 8, there being only sufficient clearance to avoid interference under operative conditions. The rear edge 7' of the guard is of concave form and is arranged as close as is practicable to the wheel-tread, this formation extending downward and backward as far as may be to form the rear extension 7'' of the guard, thereby practically closing the space on the track overhung by the front of the wheel and rendering it quite impossible for an object to enter between the wheel and guard.

The front of the guard operates as a pusher for any object which may be obstructing the track and prevents the wheel from engaging the same or running thereover. The guard is strong and durable from the fact that it forms a downward continuation of the holder and, furthermore, is securely sustained by the beam or shoe-holder hanger.

I claim—

1. The combination of a brake-shoe holder, and a downward extension for the holder positioned in front of the wheel and reaching nearly to the track.

2. A brake-shoe holder formed with a downward and rearward extension of such form as to approximately fill the space above the track overhung by the front of the wheel.

3. The combination of a brake-shoe holder formed with a downward and rearward extension lying close to the track and to the overhanging portion of the wheel, a support for the holder, and a brake-shoe secured to the holder.

4. The combination of a brake-beam, a shoe-holder at the end thereof, the holder having a downward and backward extension which approximately fills the space between the track and overhanging portion of the wheel, a brake-shoe secured to the holder, and a hanger.

In testimony whereof I affix my signature in presence of two witnesses.

EDMUND P. CRALEY.

Witnesses:
    J. M. NESBIT,
    MARGARET HUGHES.